(12) United States Patent
Lyon et al.

(10) Patent No.: US 8,725,450 B2
(45) Date of Patent: May 13, 2014

(54) METHOD AND SYSTEM FOR EVALUATING CHARACTERISTICS OF AN S-CAM

(75) Inventors: Thomas E. Lyon, Lawton, MI (US); Jeffrey L. Jones, Battle Creek, MI (US); Garrett Theodore Lyon, Lawton, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 285 days.

(21) Appl. No.: 13/188,158

(22) Filed: Jul. 21, 2011

(65) Prior Publication Data

US 2013/0024154 A1   Jan. 24, 2013

(51) Int. Cl.
*G06F 15/00* (2006.01)
*G01C 19/06* (2006.01)
*F16D 51/00* (2006.01)
*F16D 125/28* (2012.01)

(52) U.S. Cl.
CPC ............ *F16D 51/00* (2013.01); *F16D 2250/00* (2013.01); *F16D 2125/28* (2013.01)
USPC ............ 702/150; 123/90.27; 451/5; 451/239; 702/151

(58) Field of Classification Search
CPC . F16D 51/00; F16D 2250/00; F16D 2125/28; F16D 65/14; F16D 66/00; F16D 66/02; F16D 51/22; F16D 65/60; F16D 66/025; F16D 66/026; F16D 2125/56; F16D 2066/001; F16D 2066/003; F16D 2125/30; G01B 5/0028; G01B 11/14; G01B 7/023; G01B 7/003; B60T 17/22
USPC ......... 702/33, 44, 90, 94, 145, 150, 151, 182, 702/185, 188, 59.81; 73/121; 123/90.27; 188/1.11 R; 340/454; 451/5, 239
See application file for complete search history.

(56) References Cited

U.S. PATENT DOCUMENTS

| | | | |
|---|---|---|---|
| 4,299,061 A * | 11/1981 | Parnum et al. | 451/239 |
| 4,373,301 A * | 2/1983 | Parnum et al. | 451/5 |
| 5,339,069 A | 8/1994 | Penner et al. | |
| 6,105,422 A | 8/2000 | Pollock et al. | |
| 6,408,989 B2 | 6/2002 | Kramer | |
| 7,036,473 B1 * | 5/2006 | Goracy | 123/90.27 |

* cited by examiner

*Primary Examiner* — John H Le
(74) *Attorney, Agent, or Firm* — Dykema Gossett PLLC (57) ABSTRACT

A system and method for evaluating characteristics of an S-cam are provided. The inventive method includes the step of obtaining angle values and displacement values indicative of an angle of rotation of the S-cam and displacement of a cam follower caused by rotation of a lobe of the S-cam. The method further includes the step of determining a profile for the lobe of the S-cam responsive to the angle values and the displacement values. The method further includes the steps of computing a deviation of the profile from a desired profile for the lobe of the S-cam and determining a rate of change in the deviation of the profile. In addition, the system and method may evaluate characteristics such as the concentricity of the S-cam and power transfer characteristics of the S-cam.

26 Claims, 8 Drawing Sheets

METHOD AND SYSTEM FOR EVALUATING CHARACTERISTICS OF AN S-CAM

BACKGROUND OF THE INVENTION

1. Field of the Invention

This invention relates to a method and system for evaluating characteristics of an S-cam used in drum brakes and, in particular, to a method and system that improve the ability to measure deviation of a profile of the cam from a desired profile.

2. Discussion of Related Art

In a conventional drum brake, a brake drum rotates with a wheel or wheels proximate one end of an axle. The brake drum defines a radially inner braking surface. A brake spider is disposed about the axle and supports an anchor pin that extends axially from the spider. A pair of brake shoes are pivotally mounted on the anchor at a first end. Each brake shoe includes a roller, or cam follower, proximate a second end. A generally S-shaped cam engages the rollers in the brake shoes and rotation of the cam moves the brake shoes between positions of engagement and disengagement with the braking surface of the brake drum.

Proper dimensioning of the S-cam is critical to consistent application of the brake shoes against the braking surface of the brake drum. Deviation of the profile of either lobe of the S-cam from an optimal profile can lead to uneven application of braking force and uneven wear of braking components. Deviation among the profiles for the two lobes can also result in uneven application of braking force among the two brake shoes. S-cams are therefore often inspected during the manufacturing process to determine the extent of deviation from a desired profile.

Conventional methods and systems for inspecting S-cams suffer from several deficiencies. Conventional methods and systems used to inspect S-cams often rely on manual movement and measurements. As a result, the methods and systems are time consuming and relatively inaccurate. Further, conventional methods and systems fail to account for one or more important characteristics of the S-cam identified by the inventors that contribute to effective application of the S-cam. Coordinate measuring machines (CMMs) are used in many industries to measure surface profiles of various objects (including, for example engine camshafts) and overcome the inefficiencies and inaccuracies inherent in some of the manual measurements but are still highly dependent on the operator. CMMs are typically general purpose devices and/or primarily directed to parts other than the S-cam, however, and fail to account for the various characteristics of the S-cam identified by the inventors that contribute to effective application of the S-cam.

The inventors herein have recognized a need for a method and system for evaluating characteristics of S-cams that will minimize and/or eliminate one or more of the above-identified deficiencies.

SUMMARY OF THE INVENTION

The present invention provides a method, system, and article of manufacture for use in evaluating characteristics of S-cams.

A method for evaluating characteristics of an S-cam in accordance with one embodiment of the invention includes the step of obtaining angle values and a set of displacement values indicative of an angle of rotation of the S-cam and a displacement of a cam follower caused by rotation of a lobe of the S-cam. The method further includes the step of determining a profile for the lobe of the S-cam responsive to the angle values and the set of displacement values. The method further includes the step of computing a deviation of the profile from a desired profile for the lobe of the S-cam and determining a rate of change in the deviation of the profile.

A system for evaluating characteristics of an S-cam in accordance with one embodiment of the invention includes an electronic control unit configured to obtain angle values and a set of displacement values indicative of an angle of rotation of the S-cam and a displacement of a cam follower caused by rotation of a lobe of the S-cam. The electronic control unit is further configured to determine a profile for the lobe of the S-cam responsive to the angle values and the set of displacement values. The electronic control unit is further configured to compute a deviation of the profile from a desired profile for the lobe of the S-cam and to determine a rate of change in the deviation of the profile.

An article of manufacture in accordance with one embodiment of the present invention includes a computer storage medium having a computer program encoded thereon for evaluating characteristics of an S-cam. The computer program includes code for obtaining angle values and a set of displacement values indicative of an angle of rotation of the S-cam and a displacement of a cam follower caused by rotation of a lobe of the S-cam. The program further includes code for determining a profile for the lobe of the S-cam responsive to the angle values and the set of displacement values. The program further includes code for computing a deviation of the profile from a desired profile for the lobe of the S-cam and determining a rate of change in the deviation of the profile.

A method and system in accordance with the present invention are advantageous relative to conventional methods and systems because the inventive method and system evaluate one or more characteristics of S-cams that are not evaluated in conventional methods and systems and that the inventors have identified as contributing to the effective application of the S-cam. For example, the inventors have discovered that the deviation in the profile of the cam from a desired profile is insufficient, standing alone, to evaluate manufactured S-cams. In particular, a large change in the rate of deviation can lead to ineffective application of the cam even if the deviation of the cam profile from a desired profile is within acceptable limits. In addition, the inventive method and system are advantageous because they reduce and/or eliminate the need for manual movement and measurement of system components and manual computations.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
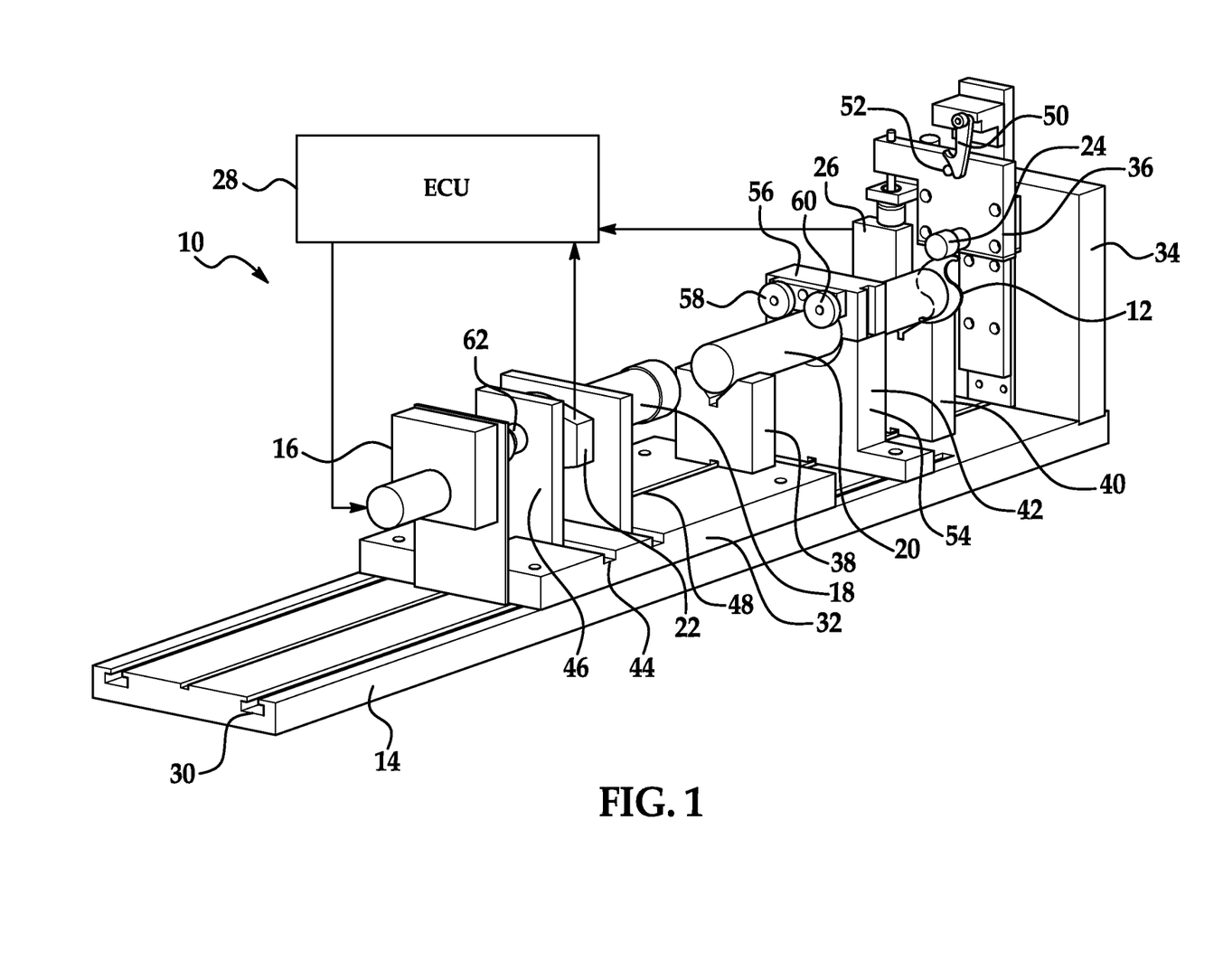
FIG. 1 is a diagrammatic representation of a system for evaluating characteristics of an S-cam in accordance with one embodiment of the present invention.

Referring now to the drawings wherein like reference numerals are used to identify identical components in the various views, FIG. 1 illustrates a system 10 for evaluating characteristics of an S-cam 12 in accordance with one embodiment of the present invention. System 10 may include a fixture base 14, a motor 16, an adapter 18, a camshaft 20, a rotary encoder 22, a cam follower 24, a linear encoder 26 and an electronic control unit 28.

Base 14 provides a means for supporting other components of system 10 and for adjusting the position of those components relative to one another. Base 14 may include a plurality of longitudinally extending grooves 30 or rails configured to permit longitudinal adjustment of the position of other components of system 10 including, for example, sub-bases 32, 34, 36, camshaft journal v-block supports 38, 40, and a camshaft retainer 42.

Sub-base 32 provides a means to support and position motor 16, adapter 18, rotary encoder 22 and support 38. Sub-base 32 includes means, such as laterally extending grooves 44 or apertures configured to receive fasteners that may be used to support upstanding plates 46 used to support motor 16, adapter 18 and encoder 20. Sub-base 32 may also include a longitudinally extending groove 48 or rail configured to permit alignment and positional adjustment of support 38.

Sub-base 34 provides a means to support linear encoder 26 and a rail on which sub-base 36 is mounted for linear movement. Sub-base 34 may be disposed proximate one end of base 14 and extends generally perpendicular to base 14. Sub-base 34 includes means, such as hook 50, for limiting movement of sub-base 36 in a predetermined direction as described in greater detail below.

Sub-base 36 provides a means to support cam follower 24 and to permit linear displacement of cam follower 24 relative to the axis of rotation of S-cam 12 in response to rotation of S-cam 12. Sub-base 36 includes a linear bearing (not shown) slidably disposed on a rail mounted to sub-base 34. A spring (not shown) urges sub-base 36 and cam follower 24 in one direction towards the rotational axis of S-cam 12 such that cam follower 24 is held in engagement with the surface of S-cam 12 while S-cam 12 rotates. Sub-base 36 further includes a retainer pin 52 configured for engagement by hook 50 on sub-base 34. As S-cam 12 rotates, the increasing radius from the throat to the tip of a lobe of S-cam 12 causes displacement of cam follower 24 away from the rotational axis of S-cam 12 and causes pin 52 to move past hook 50. Once the tip of S-cam 12 passes cam follower 24, sub-base 36 and cam follower 24 would ordinarily be urged inward towards the rotational axis of S-cam 12 by the spring referenced above. The engagement of hook 50 and pin 52, however, limits such movement to prevent damage to S-cam 12 and cam follower 24.

Supports 38, 40 are provided to support camshaft 20. Support 38 extends upward from, and is supported on, sub-base 32 while support 40 extends upward from, and is supported on, base 14. Supports 38, 40 include a generally v-shaped notch configured to receive camshaft 20.

Camshaft retainer 42 provides a means for maintaining the vertical position of camshaft 20 relative to base 14 and other components of system 10. Retainer 42 is disposed between supports 38, 40 upon assembly of system 10. Retainer 42 extends upward from, and is supported on, base 14 and the position of retainer 42 may be adjusted longitudinally along base 14. Retainer 42 includes two members 54, 56 that may be joined after placement of camshaft 20 to surround camshaft 20. Member 56 may be joined to member 54 by a hinge (not shown) at one longitudinal end of member 56. The opposite longitudinal end may be secured to member 54 by a movable clasp (not shown) that provides a downward force to member 56. A rocker affixed to member 56 has two wheels 58, 60 to balance the downward force on camshaft 20 and reduce movement that could skew measurements.

Motor 16 is provided to control rotation of camshaft 20 and, therefore, S-cam 12. Motor 16 may comprise a conventional electric motor and is supported on a plate 46 extending from sub-base 32. Motor 16 may be controlled by electronic control unit 28. A shaft 62 extends outward from motor 16 through one or more plates 46 and couples motor 16 to adapter 18.

Adapter 18 is provided to rotatably couple motor shaft 62 and camshaft 20. Adapter 18 is supported on a plate 46 extending from sub-base 32. It should be understood that adapter 18 may be configured in a variety of ways depending on the dimensions of shaft 62 and camshaft 20.

Camshaft 20 is provided to rotate S-cam 12 to simulate the actual application of S-cam 12 in a functioning brake. Camshaft 20 is conventional in the art and preferably replicates the dimensions of the actual camshafts used in a commercial brake system. Camshaft 20 is supported by supports 38, 40 and camshaft retainer 42.

Rotary encoder 22 is provided to measure the angular displacement of motor shaft 62 and, therefore, S-cam 12. Encoder 22 is conventional in the art. In one constructed embodiment, encoder 22 is a 4000 pulse encoder with 0.09 degree resolution. Encoder 22 is supported on one or more plates 46 extending from sub-base 32. Encoder 22 generates signals indicative of the angular displacement of S-cam 12 and transmits the signals to ECU 28.

Cam follower 24 provides a means for following the surface of a lobe of S-cam 12 during rotation of the lobe and is provided to simulate the displacement of cam followers in a conventional drum brake system resulting from rotation of S-cam 12. In the illustrated embodiment, the cam follower 24 or following means is a circular member substantially similar to the cam followers used in a commercial drum brake system and, in one constructed embodiment, cam follower 24 has a diameter of 0.75 inches. It should be understood, however, that cam follower 24 or following means could take on a variety of forms. For example, the cam follower 24 or following means could comprise a point probe similar to those found in conventional coordinate measuring machines that contacts the surface of S-cam 12. The cam follower or following means could also comprise an electromagnetic wave (e.g. a laser or infrared light) transmitted by an electromagnetic transmitter or emitter with the reflected wave received by an electromagnetic receiver. The illustrated cam follower 24 is supported on sub-base 36 and is engaged by the opposed lobes of S-cam 12. Although multiple cam followers 24 could be used (one for each lobe), the use of a single cam follower 24 disposed vertically above S-cam 12 provides certain benefits. First, the use of a single cam follower 24 prevents inaccuracies in measurements resulting from possible deviations between multiple cam followers. Second, mounting the cam follower above the center line of the camshaft 20 and supports 38, 40 prevents any measurement errors that might result from deviation in the size of supports 38, 40. The use of multiple cam followers 24 (one for each lobe of S-cam 12) would, however, provide an advantage in terms of the time required to determine the cam profile and other characteristics of S-cam 12 because the profile for the two lobes could be determined simultaneously without operator intervention.

Linear encoder 26 is provided to measure the displacement of cam follower 24. Linear encoder 26 is conventional in the art and, in one constructed embodiment, has a resolution of 0.0005 inches (i.e. 2000 counts per inch). Encoder 26 is supported on sub-base 34. Encoder 26 generates signals indicative of the linear displacement of cam follower 24 and transmits the signals to ECU 28.

ECU 28 provides a means for determining the profile for each lobe of S-cam 12, adjusting the profiles relative to a selected datum, computing a deviation of the profiles from desired profiles, and determining a rate of change in the deviation of the profile. ECU 28 also provides a means for determining a difference between corresponding points on the two lobes (i.e., the concentricity of S-cam 12) and to determine a power transfer value indicative of a ratio of the input force causing rotation of S-cam 12 to the output force causing movement of cam follower 24 by S-cam 12. ECU 28 may comprise a programmable microprocessor or microcontroller or may comprise an application specific integrated circuit (ASIC). ECU 28 may include a central processing unit (CPU) and an input/output (I/O) interface through which ECU 28 may receive a plurality of input signals including signals generated by rotary encoder 22 and linear encoder 26 and generate a plurality of output signals including those used to control motor 16 and to control a display or other user interface used to communicate information about the characteristics of S-cam 12.

Figure 2A:
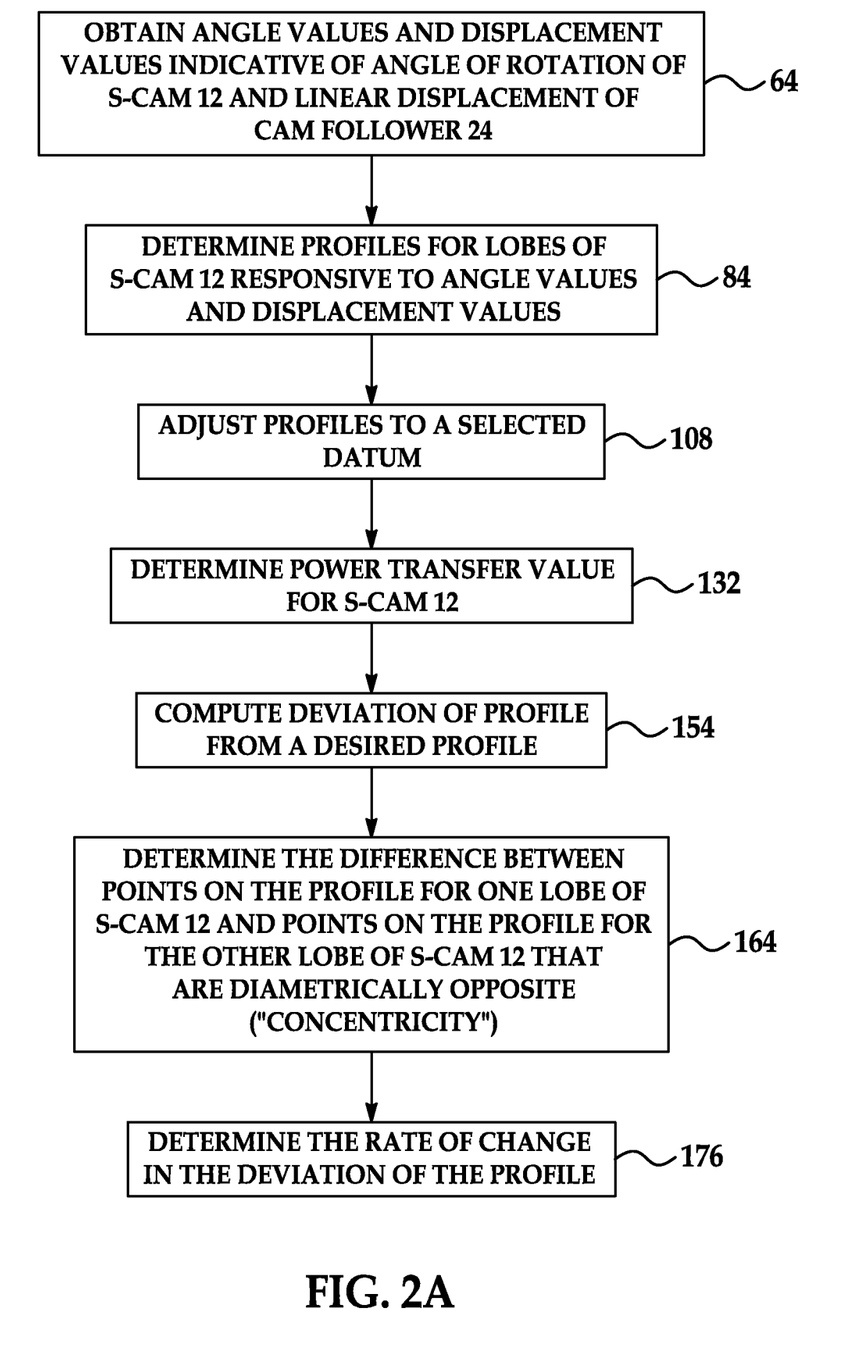
FIGS. 2A-G are flow chart diagrams illustrating a method for evaluating characteristics of an S-cam in accordance with one embodiment of the present invention.
Figure 2B:
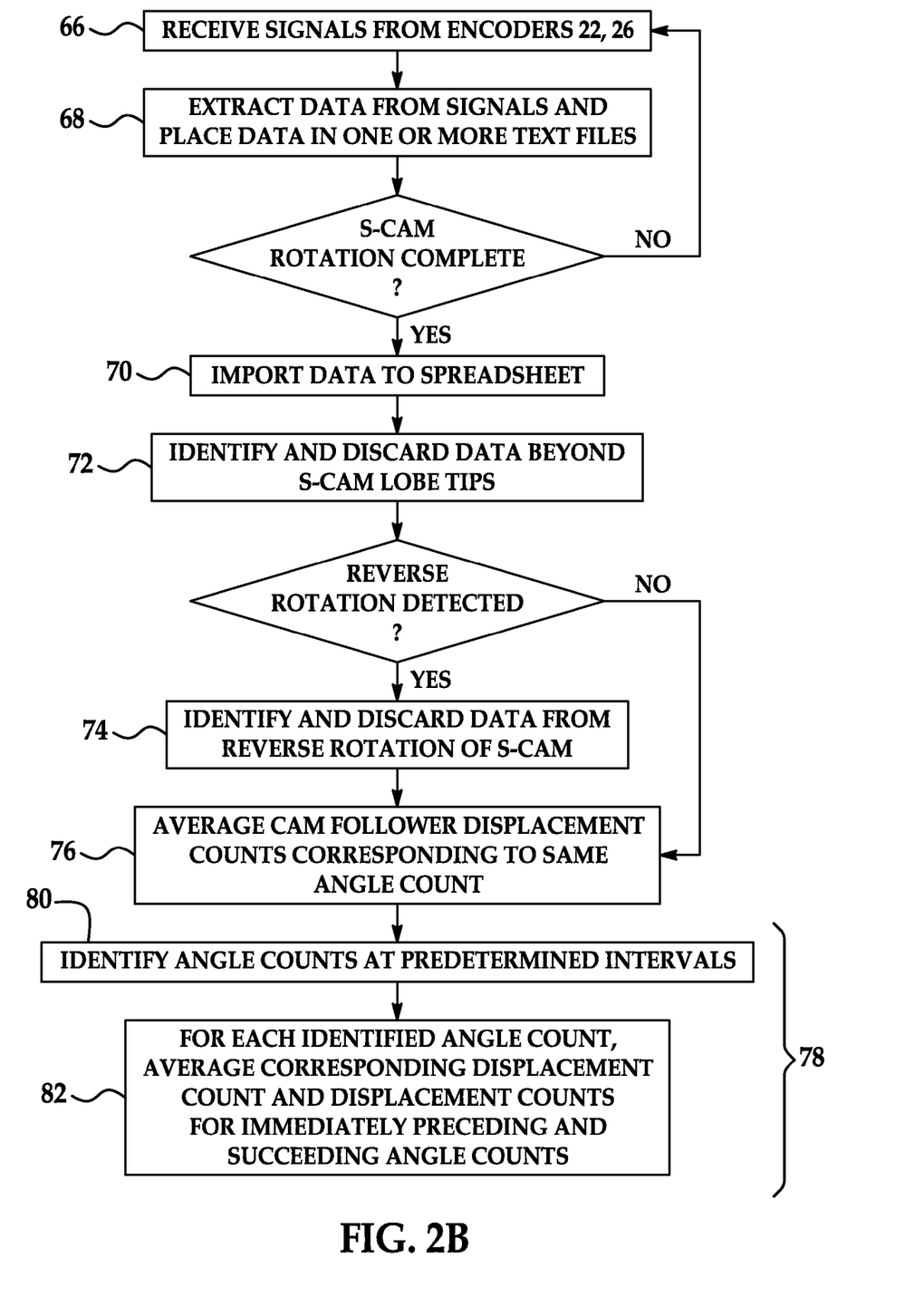

In accordance with one embodiment of the present invention, ECU 28 is configured with appropriate programming instructions or code (i.e., software) to perform several steps in a method for evaluating characteristics of S-cam 12 in accordance with the present invention. The code may be stored on, and uploaded to ECU 28 from, a conventional computer storage medium such as a compact disc (CD), digital video disc (DVD), or flash memory drive. Referring now to FIG. 2A, the method may begin with the step 64 of obtaining angle values and sets of displacement values indicative of an angle of rotation of S-cam 12 and a displacement of the cam follower 24 caused by rotation of the lobes of S-cam 12. Referring to FIG. 2B, step 64 may include several substeps.

In substeps 66 and 68, ECU 28 receives signals generated by rotary encoder 22 and linear encoder 26 and extracts data from those signals and places the data into one or more text files stored in a memory. The data consists of an angle count and displacement count for each lobe of S-cam 12 based on the resolution of encoders 22, 26 (e.g., in one constructed embodiment, the rotary encoder is a 4000 pulse encoder and the angle count will therefore range between 0 and 3999). In substep 70, once rotation of the S-cam 12 is complete, ECU 28 imports data from the text file(s) into a spreadsheet workbook (e.g., using the software sold under the trademark "EXCEL" by Microsoft Corp. of Redmond, Wash.).

Following import of the data, ECU 28 filters the data by identifying and discarding subsets of data or information meeting predetermined characteristics or resulting from a predetermined event. For example, in substep 72, ECU 28 may identify and discard any data entries after the tip of each lobe of the S-cam 12 has rotated past the cam follower 24 by, for example, detecting a decrease in the displacement count for cam follower 24 when an increasing count is expected. In substep 74, ECU 28 may identify and discard any data entries indicative of reverse rotation of S-cam 12 (e.g., by identifying a decrease in the angle count when an increasing count is expected).

After filtering the data, ECU 28 reduces the raw data to a smaller data set. In substep 76, ECU 28 may average all displacement counts corresponding to the same angle count by identifying all displacement counts corresponding to an identical angle count and averaging the displacement counts. Because the data sampling rate is sufficiently high relative to the rate of rotation of camshaft 20 and the rate of displacement of cam follower 24 is greater than the rate of change between angle counts for at least certain portions of the cam profile in the constructed embodiment, multiple displacement counts may correspond to a single angle count. Changes to the speed of rotation of camshaft 20, the data collection rates for encoders 22, 26 and the resolution of encoders 22, 26 would change this relationship. In substep 78, ECU 28 may identify angle counts at equally spaced intervals and reduce the data set to data corresponding to these equally spaced angle counts. Substep 78 may itself include several substeps 80, 82. In substep 80, ECU 28 may identify a plurality of equally spaced angle counts (in one constructed embodiment, counts spaced by an interval of 6 steps were chosen). In substep 82, ECU 28 averages, for each identified angle count, the displacement count corresponding to the identified angle count and the displacement counts corresponding to angle counts greater and less than the identified angle count (e.g. angle counts immediately above and below the identified angle count and indicative of a degree of rotation of S-cam 12 greater than and less than the angle of rotation of the S-cam 12, respectively, at the identified angle count).

Figure 2C:
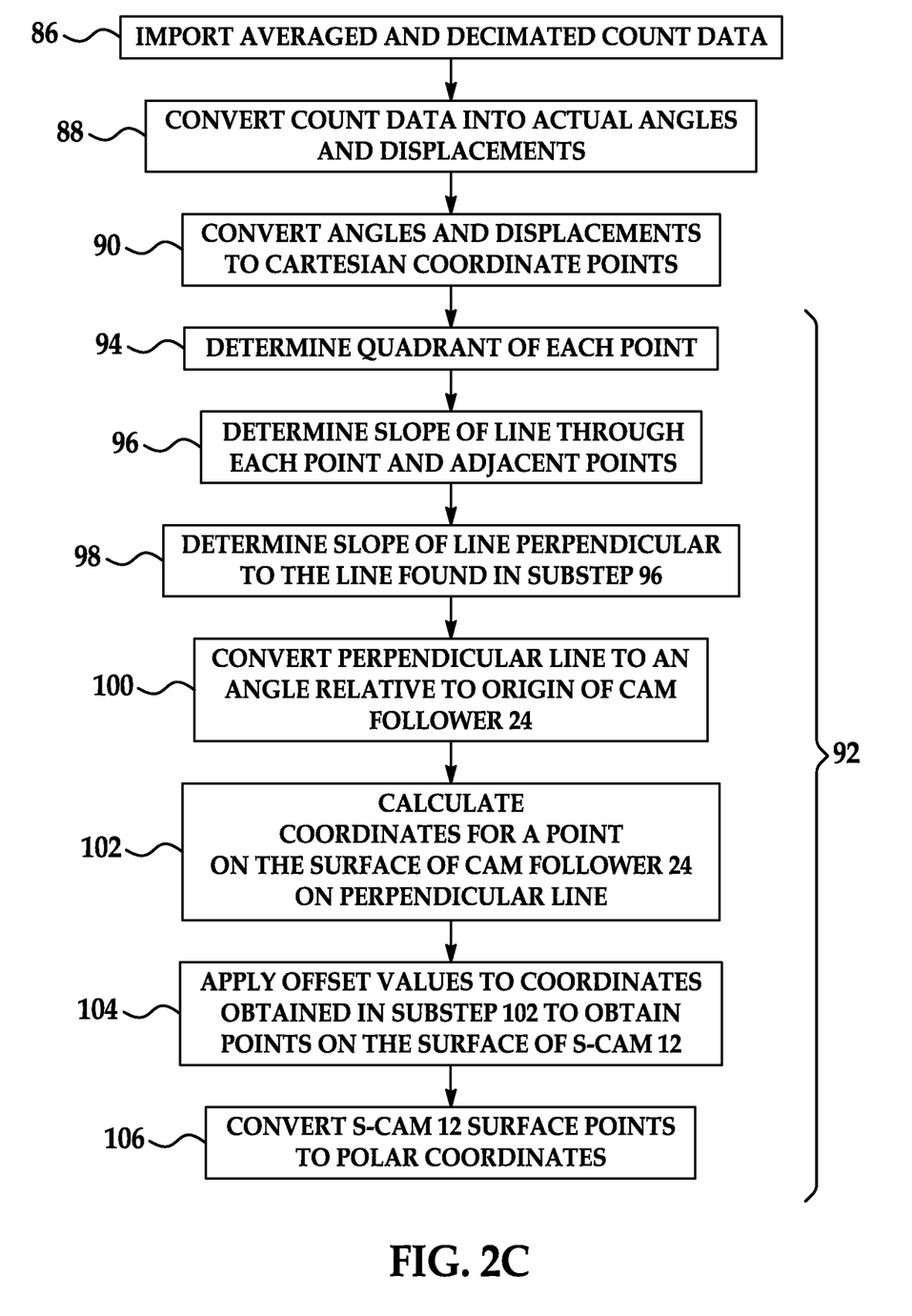

Referring again to FIG. 2A, the method may continue with the step 84 of determining profiles for each lobe of cam 12 responsive to the angle values and displacement values obtained in step 64. Referring to FIG. 2C, step 84 may include several substeps.

In substep 86, ECU 28 imports the average and decimated data obtained in substeps 76, 78 (see FIG. 2B) into a new worksheet of the spreadsheet workbook. In substep 88, ECU 28 converts the data (which is thus far measured in terms of step counts by encoders 22, 26) into actual angles (in degrees) and displacements (in, e.g., inches). As noted hereinabove, in one constructed embodiment rotary encoder 22 is a 4000 pulse count encoder. Accordingly, encoder 22 has a resolution of 0.09 degrees per count (i.e. 360 degrees divided by 4000 counts) and ECU 28 can obtain actual angles by multiplying the angle counts by 0.09 degrees per count. Also as noted hereinabove, in one constructed embodiment linear encoder 26 has a resolution of 2000 counts per inch such that each count equals 0.0005 inches. The system 10 is initially calibrated using a precision diameter bar in place of the S-cam 12 and camshaft 20 and a calibration count is set at a number to avoid overflow of count data (i.e. from a maximum count to a count of zero). The displacement of the cam followers 24 is then calculated by subtracting the displacement count from the calibration count and multiplying the result by 0.0005. This result is then added to the radius of the precision bar and the radius of follower 24 to generate a displacement value which is equal to the distance from the center of the cam follower 24 to the center axis of the S-cam 12 and camshaft 20. In substep 90, ECU 28 converts the angles and displacements obtained in step 88 from polar coordinates into Cartesian coordinates (i.e. to points (x, y) in the coordinate system).

Figure 3:
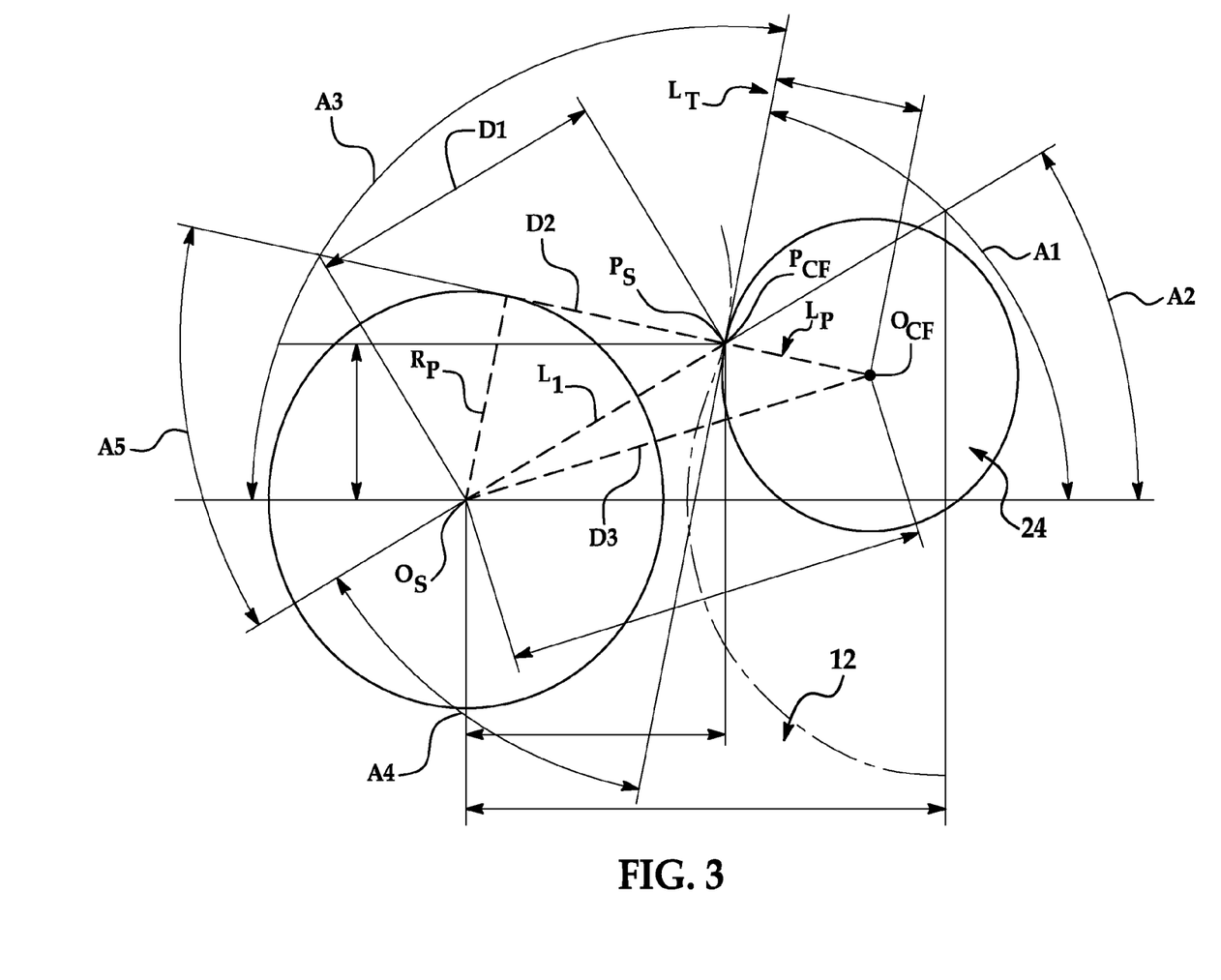
FIG. 3 is an enlarged plan view illustrating the engagement of an S-cam and a cam follower and used to illustrate several aspects of the inventive method and system.

Referring to FIGS. 2C and 3, in substep 92, ECU 28 calculates each surface point $P_S$ of the profile for a given lobe of S-cam 12. Substep 92 itself may include several substeps. In substep 94, ECU 28 determines the quadrant for a given point in the Cartesian coordinate system obtained in substep 90 above. In substep 96, ECU 28 determines the slope of a line through the given point and connecting adjacent points on either side of the given point using a best fit least squares analysis. As a result, a line that essentially extends through the center $O_{CF}$ of the cam follower 24 at a plurality of measured points is calculated. The polarity of the slope is determined using the information obtained in substep 94. In substep 98, ECU 28 determines the slope of a line $L_P$, perpendicular to the line obtained in substep 96. Line $L_P$ extends from the center $O_{CF}$ of the cam follower 24 to the surface of the cam follower 24. In substep 100, ECU 28 converts the perpendicular line $L_P$ to an angle relative to an origin or center $O_{CF}$ of the cam follower 24. Using the known angle and the known radius of cam follower 24, in substep 102 ECU 28 calculates the location of a point $P_{CF}$ at the surface of cam follower 24 along the perpendicular line $L_P$. In substep 104, ECU 28 applies offset values representing the horizontal and vertical displacement of the center $O_{CF}$ of cam follower 24 relative to the center $O_S$ or axis of rotation of S-cam 12 to the point $P_{CF}$ obtained in substep 102 to obtain a surface point $P_S$ on the surface of the lobe of S-cam 12. In substep 106, ECU 28 may convert the Cartesian coordinates for each of point $P_S$ to polar coordinates in a conventional manner.

Figure 2D:
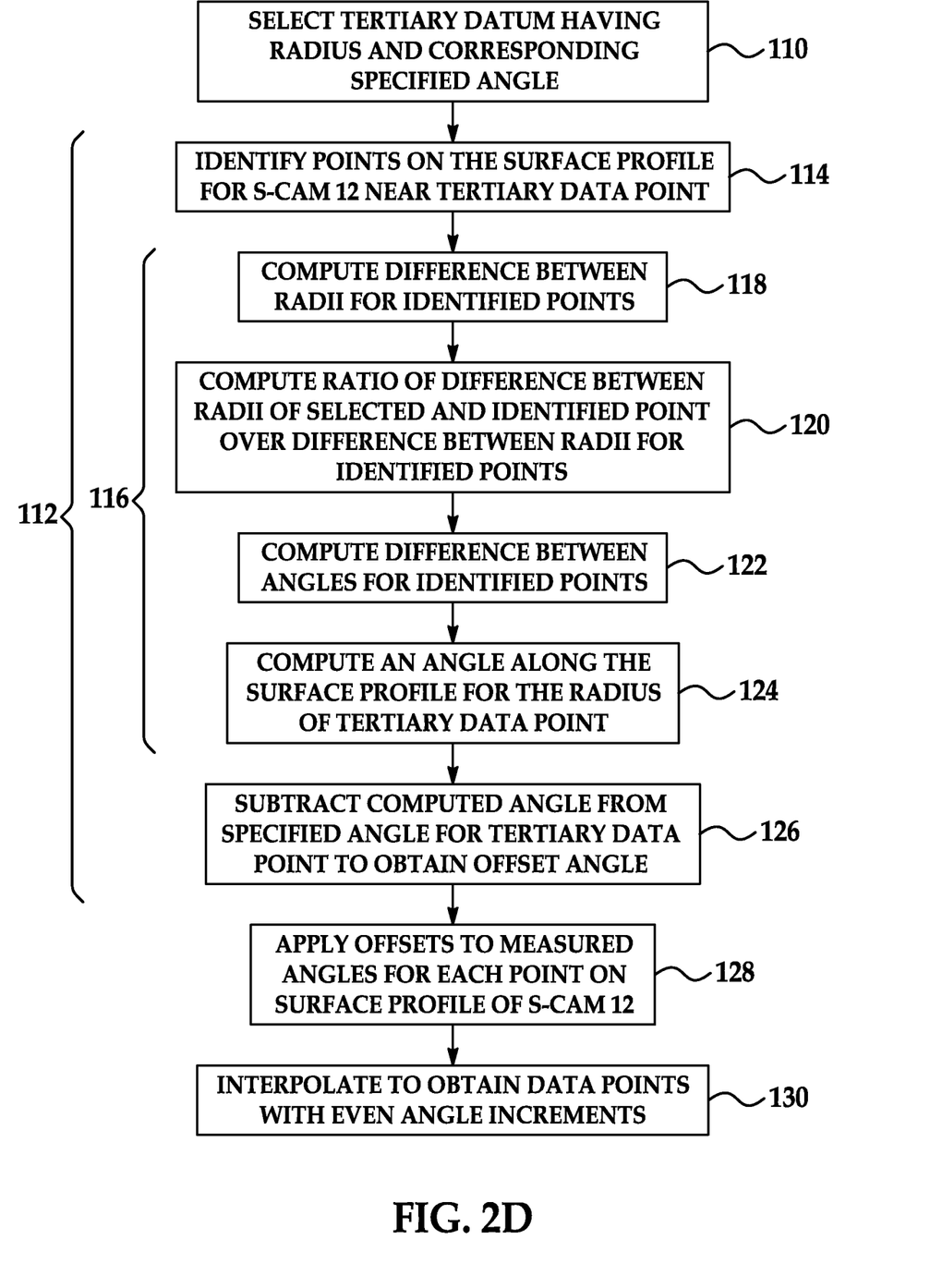

Referring again to FIG. 2A, the method may continue with the step 108 of adjusting the determined profiles for the lobes of S-cam 12 relative to a selected datum at which the determined profile will be deemed to have no deviation from a desired profile. The determined profiles are still a relative measurement. The rotational axis of the S-cam 12 establishes primary and secondary datums, but a tertiary datum may be needed to account for rotational movement of S-cam 12. Referring to FIGS. 2D, step 108 may include several substeps.

In substep 110, a particular radial measurement from the center of the S-cam 12 to the surface of each lobe is selected. The radial measurement must be less than the maximum radius of the S-cam 12. In line with traditional measurement systems, the radial measurement can be identified using a precision pin placed in an exact location such that rotation of camshaft 20 causes S-cam 12 to contact the pin and establish the selected datum. Alternatively, the radial measurement can be identified based on values associated with a selected point correlated to the design of S-cam 12 (e.g. the point on the S-cam 12 that engages cam follower 24 when the brake shoes first contact the braking surface). The radial measurement has a corresponding angle by specification which is preferably an integer value.

In substep 112, ECU 28 determines an offset angle such that a point on the surface profile of a given lobe of S-cam 12 determined in substeps 104, 106 having the radial measurement of the selected point in substep 110 also has an angle measurement equal to the corresponding angle for the selected point in substep 110. Substep 112 itself may have several substeps. In substep 114, ECU 28 identifies points on the surface profile for a lobe of S-cam 12 having the nearest radial measurements greater than and smaller than the radial measurement of the selected point (except in the unlikely event that a points on the surface profile has a radial measurement equal to the radial measurement of the selected point). In substep 116, ECU 28 interpolates between these radial measurements and their corresponding angle measurements to obtain an angle measurement corresponding to the radial measurement of the selected data point. In particular, substep 116 may include the substep 118 in which ECU 28 computes the difference R_RANGE between the two radial measurements R_SMALLER and R_GREATER for the identified points.

$$R\_RANGE = R\_GREATER - R\_SMALLER$$

In substep 120, ECU 28 then computes a ratio of the difference between the radial measurement R_SELECTED of the selected point minus the radial measurement R_SMALLER of the nearest radial measurement smaller than the radial measurement of the selected point over the difference R_RANGE computed in substep 118.

$$R\_RATIO = \frac{R\_SELECTED - R\_SMALLER}{R\_RANGE}$$

In substep 122, ECU computes the difference ANGLE_RANGE between the measured angles ANGLE_LARGER and ANGLE_SMALLER corresponding to the points identified in substep 114.

$$ANGLE\_RANGE = ANGLE\_GREATER - ANGLE\_SMALLER$$

Finally, in substep 124, ECU 28 computes an angle measurement corresponding to the radial measurement of the selected data point by multiplying the ratio R_RATIO obtained in substep 120 by the difference ANGLE_RANGE obtained in substep 122 and adding the total to ANGLE_SMALLER:

$$ANGLE = R\_RATIO * ANGLE\_RANGE + ANGLE\_SMALLER$$

Having interpolated between the selected data points to obtain an angle corresponding to the radial measurement of the selected data point, in substep 126 ECU 28 subtracts the interpolated angle ANGLE from the corresponding angle for the selected data point to obtain the offset angle.

In substep 128, ECU 28 adds the offset angle to the measured angles for each data point of the measured profile of the lobe of the S-cam 12 to thereby align the measured profile with the tertiary data point. In substep 130, ECU 28 may further interpolate in a conventional manner between the measured radiuses for the data points of the profile to obtain adjusted data points having even (and preferably integer) corresponding angle increments.

Figure 2E:
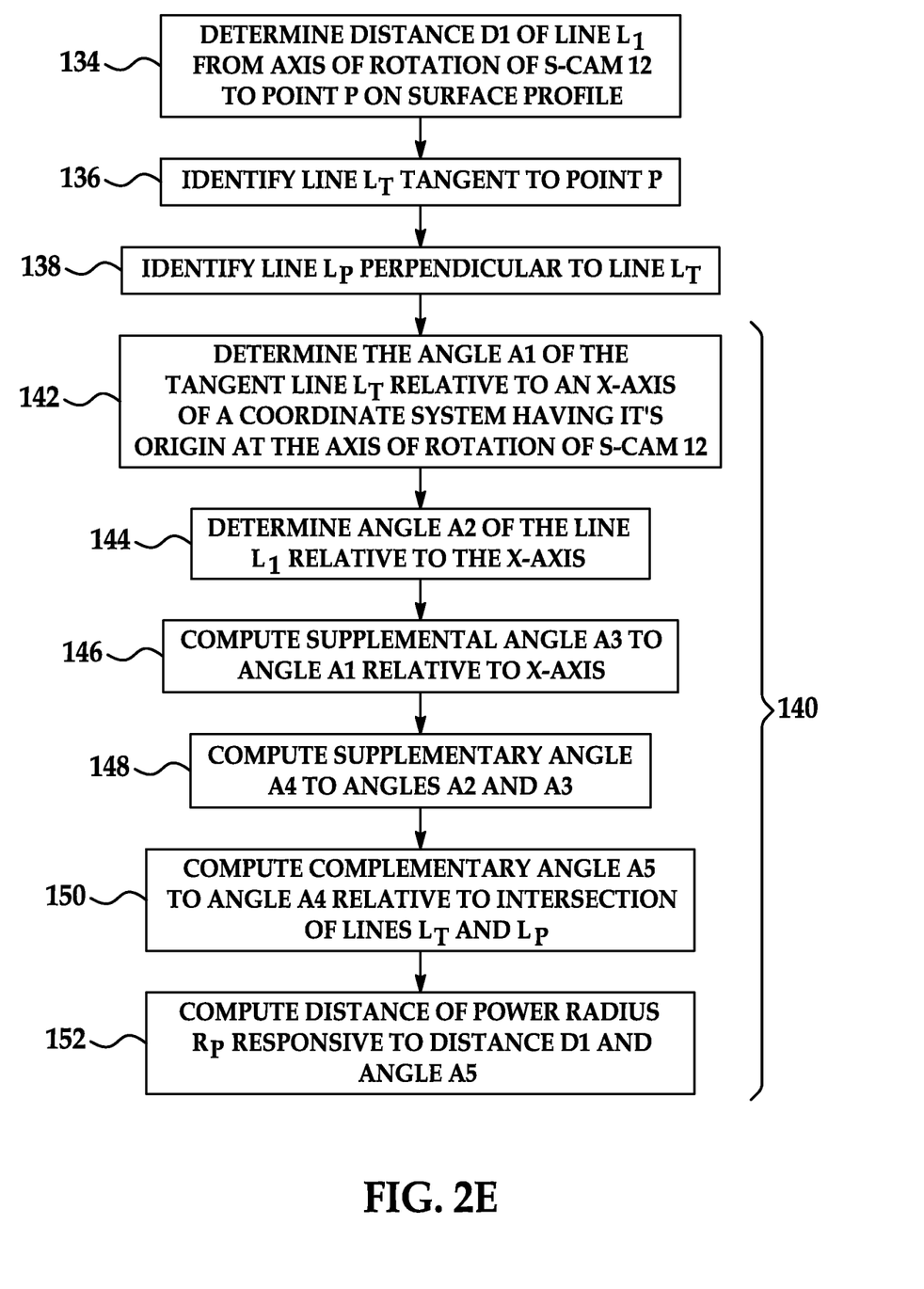

Referring again to FIG. 2A, in accordance with one aspect of the invention, the method may continue with the step 132 of determining a power transfer value for S-cam 12 indicative of a ratio of the input force from camshaft 20 causing rotation of S-cam 12 to the output force causing movement of cam follower 24 by S-cam 12. This power transfer value, which corresponds to a radius relative to the axis of rotation of S-cam 12 (the "power circle") is one characteristic of S-cam 12 that the inventors have identified as indicative of the effective application of S-cam 12. In particular, the power transfer value should preferably remain constant and variation in the value is indicative of deviations in the surface profile of S-cam 12. Referring to FIG. 2E, step 132 may include several substeps.

In substep 134, ECU 28 may determine a distance D1 of a line $L_1$ from the axis of rotation of S-cam 12, which serves as the origin for the coordinate system, to a selected point on the profile for a lobe of S-cam 12. Referring to FIG. 3, this distance D1 may be obtained by converting the polar coordinates of a selected point $P_S$ on the surface of S-cam 12 to Cartesian coordinates and using the Pythagorean theorem. Referring to FIGS. 2E and 3, in substeps 136 and 138, ECU 28 may identify a tangent line $L_T$ that is tangent to the selected point $P_S$ on the profile and a perpendicular line $L_P$ that is perpendicular to the tangent line $L_T$. The slope of the tangent line $L_T$ may be obtained by, for example, using points on the profile on either side of the selected point $P_S$ or by using a best-fit method using the selected point $P_S$ and the points on either side of point $P_S$ and a least square fitting.

In substep 140, ECU may compute, responsive to the distance obtained in substep 134, a power radius $R_P$ from the origin $O_S$ of the coordinate system to the perpendicular line $L_P$. Substep 140 may itself include several substeps. In particular, in substep 142, ECU 28 may determine the angle A1 of the tangent line $L_T$ relative to a line through the x-axis of the coordinate system. In substep 144, ECU 28 may compute the angle A2 of line L₁ relative to the line through the x-axis of the coordinate system. In substeps 146, 148, ECU 28 may compute the supplemental angle A3 to angle A1 and the supplemental angle A4 to angles A2 and A3 relative to the x-axis of the coordinate system. In substep 150 ECU 28 computes the complementary angle A5 to angle A4 relative to the intersection of tangent line $L_T$ and perpendicular line $L_P$. In substep 152, ECU 28 computes the length of power radius $P_R$ responsive to angle A5 and the distance D1 (i.e. sin(A5)*D1; $P_R$ forms a right angle to line $L_P$). Substeps 134-152 may be repeated for each point on the surface profile of each lobe of S-cam 12 to define the complete "power circle."

Figure 2F:
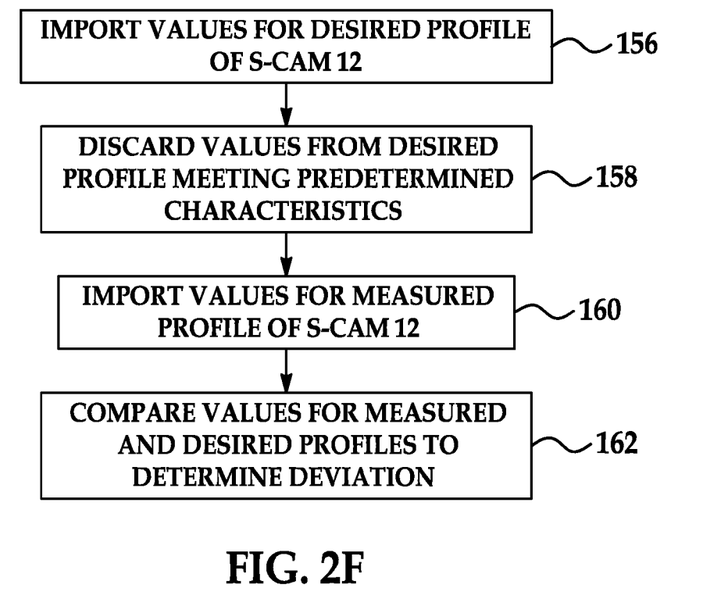

Referring again to FIG. 2A, the method may continue with the step 154 of computing a deviation of the profile for a lobe of S-cam 12 from a desired profile for the lobe. Referring to FIG. 2F, step 154 may include several substeps. In substep 156, ECU 28 imports values for a desired profile from an inspection file to a separate worksheet in the spreadsheet. In substep 158, ECU 28 discards values from the desired profile meeting predetermined conditions (e.g. ECU 28 may discard data for any angle less than −10 degrees). In substep 160, ECU 28 imports the measured values (radius and angle) for each point on the cam profile as determined in substep 130 hereinabove. In substep 162, ECU 28 compares the measured radius values to the inspection radius values for the desired profile at each inspection angle to determine the deviation of the profile. At the tertiary datum angle the inspection radius equals the measured radius. The deviation equals zero. Steps 156-162 may be repeated for each lobe of S-cam 12.

Figure 2G:
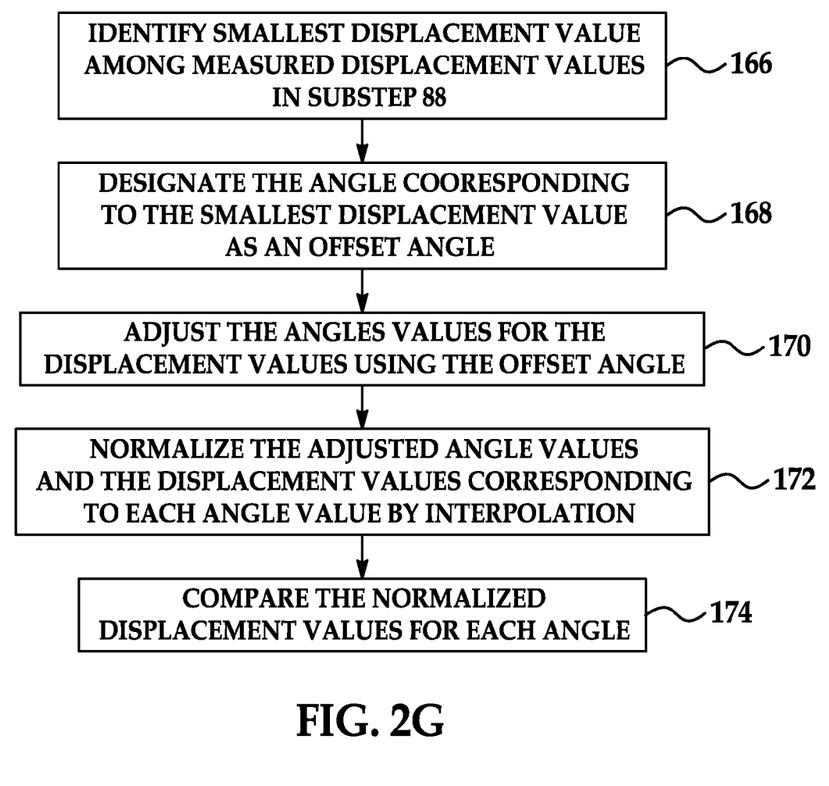

Referring again to FIG. 2A, in accordance with another aspect of the present invention, the method may continue with the step 164 of determining the difference between points on the profile for one lobe of S-cam 12 relative to points on the profile for the other lobe of S-cam 12 that are diametrically opposite one another relative to the axis of rotation of S-cam 12 (i.e., the concentricity of S-cam 12). The concentricity is another characteristic that the inventors have identified has contributing to the effective application of S-cam 12. Referring to FIG. 2G, step 164 may include several substeps. In substep 166, ECU 28 identifies the smallest measured displacement value for cam follower 24—which corresponds to the smallest radial measurement of S-cam 12 among the points on the profile of one of the lobes—among the measured displacement values obtained above in substep 88. If the smallest displacement value or radial measurement is the same for multiple points, ECU 28 may select among the points using any of a variety of conventional criteria. In substep 168, ECU 28 designates the corresponding angle for the displacement value as an offset angle. In substep 170, ECU 28 adjusts the angles values corresponding to each displacement value for cam follower 24 using the offset angle (such that point identified in step 166 now has an angle value of zero) to obtain adjusted angles corresponding to each displacement value. In substep 172, ECU 28 normalizes the adjusted angle values to angles having even increments (preferably to integer values) by interpolation and normalizes the displacement values for cam follower 24 by interpolation to correspond to the angle values. Finally, in substep 174, ECU 28 compares the displacement values for the cam follower 24 resulting from engagement by each lobe corresponding to each of the diametrically opposed angles to obtain a value indicative of the concentricity of S-cam 12.

Referring again to FIG. 2A, the method may continue with the step 176 of determining a rate of change in the deviation of the profile of S-cam 12. The inventors have determined that the rate of change in the deviation is an important characteristic of S-cam 12 contributing to the effective application of S-cam 12. The rate of change in the deviation of the profile may be determined relative to a predetermined portion of the profile (e.g., over a ten degree range). The rate of change in the deviation may be calculated using the following formula representing the slope of the linear regression line through the profile data points (identified as "SLOPE" in the Excel spreadsheet program referenced hereinabove):

$$b = \frac{\sum (x - \bar{x})(y - \bar{y})}{\sum (x - \bar{x})^2}$$

ECU 28 may generate data indicative of the rate of change in deviation and of other characteristics of S-cam 12 in a variety of ways including output to peripheral devices such as a display or a printer. The data may be represented in graphical an other forms.

A method and system in accordance with the present invention are advantageous relative to conventional methods and systems because the inventive method and system evaluate one or more characteristics of S-cams that are not evaluated in conventional methods and systems and that the inventors have identified as contributing to the effective application of the S-cam. In addition, the inventive method and system are advantageous because they reduce and/or eliminate the need for manual movement and measurement of system components and manual computations.

While the invention has been shown and described with reference to one or more particular embodiments thereof, it will be understood by those of skill in the art that various changes and modifications can be made without departing from the spirit and scope of the invention.

We claim:

1. An article of manufacture, comprising:
a non-transitory computer storage medium having a computer program encoded thereon that when executed by an electronic control unit evaluates characteristics of an S-cam, said computer program including code for:
obtaining a first set of angle values and a first set of displacement values indicative of an angle of rotation of said S-cam and a displacement of a first cam follower caused by rotation of a first lobe of said S-cam;
determining a profile for said first lobe of said S-cam responsive to said first set of angle values and said first set of displacement values;
computing a deviation of said profile from a desired profile for said first lobe of said S-cam; and,
determining a rate of change in said deviation of said profile.

2. The article of manufacture of claim 1 wherein said computer program further includes code for:
obtaining a second set of displacement values indicative a displacement of one of said first cam follower and a second cam follower caused by rotation of a second lobe said S-cam;
determining a profile for said second lobe of said S-cam responsive to said second set of displacement values and one of said first set of angle values and a second set of angle values indicative of an angle of rotation of said S-cam; and,
determining a difference between a first lobe point on said profile for said first lobe and a second lobe point on said profile for said second lobe, said first and second lobe points diametrically opposite one another relative to said axis of rotation of said S-cam.

3. The article of manufacture of claim 2 wherein said code for determining a difference between said first lobe point and said second lobe point includes code for:
  identifying a lowest displacement value among said first set of displacement values;
  designating an angle value of said first set of angles values corresponding to said lowest displacement value as an offset angle;
  adjusting angle values from said first set of angle values corresponding to each of said first set of displacement values using said offset angle to obtain adjusted angles corresponding to each of said first set of displacement values; and,
  generating normalized angle values and corresponding normalized displacement values by interpolation of said adjusted angles and said first set of displacement values.

4. The article of manufacture of claim 1 wherein said computer program further includes code for:
  determining a power transfer value for said S-cam indicative of a ratio of an input force causing rotation of said S-cam to an output force causing movement of said first cam follower by said S-cam.

5. The article of manufacturer of claim 4 wherein said code for determining a power transfer value includes codes for:
  determining a distance from an origin of said S-cam to a selected point on said profile for said first lobe of said S-cam
  identifying a tangent line tangent to said selected point on said profile for said first lobe of said S-cam;
  identifying a perpendicular line perpendicular to said tangent line; and,
  computing, responsive to said distance, a power radius from said origin to said perpendicular line, said power radius perpendicular to said perpendicular line.

6. The article of manufacture of claim 1 wherein said computer program further includes code for adjusting said profile relative to a selected datum.

7. The article of manufacture of claim 1 wherein said rate of change in said deviation is determined relative to a predetermined portion of said profile.

8. A system for evaluating characteristics of an S-cam, comprising:
  an electronic control unit configured to:
    obtain a first set of angle values and a first set of displacement values indicative of an angle of rotation of said S-cam and a displacement of a first cam follower caused by rotation of a first lobe of said S-cam;
    determine a profile for said first lobe of said S-cam responsive to said first set of angle values and said first set of displacement values;
    compute a deviation of said profile from a desired profile for said first lobe of said S-cam; and,
    determine a rate of change in said deviation of said profile.

9. The system of claim 8 wherein said electronic control unit is further configured to:
  obtain a second set of displacement values indicative a displacement of one of said first cam follower and a second cam follower caused by rotation of a second lobe said S-cam;
  determine a profile for said second lobe of said S-cam responsive to said second set of displacement values and one of said first set of angle values and a second set of angle values indicative of an angle of rotation of said S-cam; and,
  determine a difference between a first lobe point on said profile for said first lobe and a second lobe point on said profile for said second lobe, said first and second lobe points diametrically opposite one another relative to said axis of rotation of said S-cam.

10. The system of claim 9 wherein said electronic control unit is further configured, in determining a difference between said first lobe point and said second lobe point, to:
  identify a lowest displacement value among said first set of displacement values;
  designate an angle value of said first set of angles values corresponding to said lowest displacement value as an offset angle;
  adjust angle values from said first set of angle values corresponding to each of said first set of displacement values using said offset angle to obtain adjusted angles corresponding to each of said first set of displacement values; and,
  generate normalized angle values and corresponding normalized displacement values by interpolation of said adjusted angles and said first set of displacement values.

11. The system of claim 8 wherein said electronic control unit is further configured to determine a power transfer value for said S-cam indicative of a ratio of an input force causing rotation of said S-cam to an output force causing movement of said first cam follower by said S-cam.

12. The system of claim 11 wherein said electronic control unit is further configured, in determining said power transfer value, to:
  determine a distance from an origin of said S-cam to a selected point on said profile for said first lobe of said S-cam
  identify a tangent line tangent to said selected point on said profile for said first lobe of said S-cam;
  identify a perpendicular line perpendicular to said tangent line; and,
  compute, responsive to said distance, a power radius from said origin to said perpendicular line, said power radius perpendicular to said perpendicular line.

13. The system of claim 8 wherein said electronic control unit is further configured to adjust said profile relative to a selected datum.

14. The system of claim 8 wherein said rate of change in said deviation is determined relative to a predetermined portion of said profile.

15. The system of claim 8, further comprising:
  a shaft supporting said S-cam;
  a motor configured to cause rotation of said shaft;
  a rotary encoder configured to determine said angle of rotation of said S-cam.

16. The system of claim 8, further comprising:
  means for determining displacement of said first cam follower.

17. The system of claim 16 wherein said determining means comprises a linear encoder.

18. The system of claim 16 wherein said determining means comprises an electromagnetic transmitter configured to direct an electromagnetic wave towards said S-cam and an electromagnetic receiver configured to receive a reflected wave.

19. A method for evaluating characteristics of an S-cam, comprising the steps of:
  executing a plurality of program instructions in an electronic control unit including instructions for
    obtaining a first set of angle values and a first set of displacement values indicative of an angle of rotation of said S-cam and a displacement of a first cam follower caused by rotation of a first lobe of said S-cam;

determining a profile for said first lobe of said S-cam responsive to said first set of angle values and said first set of displacement values;

computing a deviation of said profile from a desired profile for said first lobe of said S-cam; and, determining a rate of change in said deviation of said profile.

20. The method of claim 19 wherein said plurality of program instructions further includes instructions for:

obtaining a second set of displacement values indicative a displacement of a second cam follower caused by rotation of a second lobe said S-cam;

determining a profile for said second lobe of said S-cam responsive to said second set of displacement values and one of said first set of angle values and a second set of angle values indicative of an angle of rotation of said S-cam; and, determining a difference between a first lobe point on said profile for said first lobe and a second lobe point on said profile for said second lobe, said first and second lobe points diametrically opposite one another relative to said axis of rotation of said S-cam.

21. The method of claim 20 wherein said instructions for determining a difference between said first lobe point and said second lobe point includes instructions for:

identifying a lowest displacement value among said first set of displacement values;

designating an angle value of said first set of angles values corresponding to said lowest displacement value as an offset angle;

adjusting angle values from said first set of angle values corresponding to each of said first set of displacement values using said offset angle to obtain adjusted angles corresponding to each of said first set of displacement values; and, generating normalized angle values and corresponding normalized displacement values by interpolation of said adjusted angles and said first set of displacement values.

22. The method of claim 19 wherein said plurality of program instructions further includes instructions for determining a power transfer value for said S-cam indicative of a ratio of an input force causing rotation of said S-cam to an output force causing movement of said first cam follower by said S-cam.

23. The method of claim 22 wherein said instructions for determining a power transfer value includes instructions for:

determining a distance from an origin of said S-cam to a selected point on said profile for said first lobe of said S-cam identifying a tangent line tangent to said selected point on said profile for said first lobe of said S-cam;

identifying a perpendicular line perpendicular to said tangent line; and, computing, responsive to said distance, a power radius from said origin to said perpendicular line, said power radius perpendicular to said perpendicular line.

24. The method of claim 19 wherein said plurality of program instructions further includes instructions for adjusting said profile relative to a selected datum.

25. The method of claim 19 wherein said rate of change in said deviation is determined relative to a predetermined portion of said profile.

26. A system for evaluating characteristics of an S-cam, comprising:

means for following the surface of a first lobe of said S-cam during rotation of said first lobe;

an electronic control unit configured to:

obtain a first set of angle values and a first set of displacement values indicative of an angle of rotation of said S-cam and a displacement of said following means caused by rotation of said first lobe of said S-cam;

determine a profile for said first lobe of said S-cam responsive to said first set of angle values and said first set of displacement values;

compute a deviation of said profile from a desired profile for said first lobe of said S-cam; and, determine a rate of change in said deviation of said profile.

* * * * *